Patented June 8, 1948

2,442,772

UNITED STATES PATENT OFFICE 2,442,772

PREPARATION AND USE OF ZIRCONIA GELS IN THE CONVERSION OF HYDROCARBONS

Milton M. Marisic and Edward M. Griest, Woodbury, N. J., assignors to Socony-Vacuum Oil Company, Incorporated, a corporation of New York No Drawing. Application March 16, 1944, Serial No. 526,825

16 Claims. (Cl. 196—52)

This invention relates to stable hydrogels of zirconium oxide and to the porous products obtained by removal of water therefrom. More particularly, the invention is concerned with a method for forming such hydrogels which is adapted to commercial practice. The subject matter of the present invention is related to that described in our copending application Serial No. 526,824, filed March 16, 1944.

Many inorganic hydrogels were prepared at an early date by dialysis of aqueous sols prepared by hydrolysis of inorganic salts. This method is generally applicable to silica and metal oxides, but is not suited to commercial production because the dialysis is extremely slow, requiring a period of weeks or months for relatively small batches. That difficulty has been overcome in connection with some hydrogels, notably that of silica, by formation of a hydrosol by mixing of suitable dilute aqueous solutions. At least one attempt has been made to apply the same technique to zirconia, but prior to this invention, the formation of stable zirconia hydrogels capable of being washed and dried has not been achieved.

It has been reported by C. B. Hurd et al., in Journal Am. Chem. Soc., 64, 110–114 (1942), that zirconia hydrogel may be prepared by mixing solutions of sodium salts and zirconyl chloride. The authors reported that the hydrogels prepared by mixing solutions of sodium acetate and zirconyl chloride reliquefied on standing at room temperature, while hydrogels formed from sodium carbonate and zirconyl chloride reliquefied at temperatures above 90° C. Finally, they conclude that zirconia hydrogels are soft and weak in contrast to silica hydrogel, and that the former do not hold their form.

We have prepared zirconia hydrogels by the methods employed by Hurd et al. and found that on attempting to wash the hydrogels with water at room temperature they dissolved completely. It would seem that it is impossible to prepare a dry zirconia gel by that method.

Notice may also be taken of the fact that plural oxide gels comprising zirconia as a minor constituent may be prepared by formation of a hydrosol containing a major proportion of some other water insoluble inorganic oxide, for example silica.

It has been shown heretofore that zirconia is a valuable catalytic agent and component of catalytic compositions. For example, active catalysts for cracking of hydrocarbons are prepared by forming compositions of silica and zirconia. According to one known method, silica gel is impregnated with zirconium nitrate and ignited to decompose the metal salt to zirconia. Molded mixtures of silica and zirconia precipitates have also been suggested as hydrocarbon conversion catalysts. Results obtained by these methods of preparing petroleum conversion catalysts indicated that zirconia is a valuable constituent. However, impregnation is not fully satisfactory because of difficulties in control; and precipitates in general share the disadvantages of being soft and chalky in structure and low in catalytic activity.

The present invention provides a method for the preparation of true hydrogels consisting of zirconia or comprising zirconia as the major inorganic oxide constituent and of such stability that they may be washed free of water soluble matter and dried to form extremely porous, hard, translucent and glassy masses. These may be used as such, impregnated with other oxides and the like, or milled with other substances. Preferably, milling is done before dehydration is complete; as by kneading washed wet zirconia gel with wet alkali-free silica gel in a ball mill to prepare the mixture for extrusion to pellets and the like. In order to facilitate the molding of the composited gels, a minor portion of the gels may be added during the kneading operation in the form of a dry finely-divided powder.

These and other objects and advantages of the invention are obtained by reacting aqueous solutions of soluble zirconium compounds with water soluble salts of weak acids, such as acetic, carbonic, lactic, oxalic, nitrous and sulfurous acids, to yield homogeneous zirconia hydrosols containing substantially no precipitate and preferably having a pH value of about 1.5 to about 7; permitting the sol to gel and thereafter washing the hydrogel with an aqueous medium preferably at temperatures above about 60° C. until the gel is substantially free of water soluble salts. Washed zirconia hydrogel is stable in neutral solvents, but dissolves in acids and acidic salts, hence this fact must be taken into account when converting the hydrogel into catalytic masses by impregnation with desirable components by any means. For most purposes, drying to yield a dry porous body is desired and this may advantageously be accomplished by removal of water at about 75° to 120° C. until shrinkage of the gel due to removal of water has been completed, whereupon the zirconia gel is further dehydrated at about 300° C. The term "weak acid" as used here has the connotation generally understood in the art. It refers to acids having relatively low ionization constants, say, below 0.1, as contrasted with the strong mineral acids, hydrochloric, sulfuric, etc., which are substantially completely ionized except in very concentrated solutions.

Zirconia hydrogels prepared by reacting solutions of a zirconium compound and a salt of a weak acid may or may not be stable on standing at room temperature for long periods of time. For example, a gel prepared from solutions of zirconyl chloride and ammonium carbonate is stable at room temperature, while a gel from zirconyl chloride and ammonium acetate reliquefied under the same conditions. Neither of these gels can be washed at room temperature without complete or substantial solution of zirconia; however, the loss of zirconia decreases with increase in temperature of the wash water, and at 60° C. or above there is no loss of zirconia due to solution in water.

Zirconia hydrogels prepared from solutions of a zirconium compound and two or more salts of weak acids containing at least two different kinds of acid radicals are stable at room temperature and may be washed with water at this temperature with only a little loss of zirconia. Since we have found that there is no liquefaction of zirconia gel in water at 60° C., and because in commercial practice it is undesirable to lose any valuable material which subsequently must be recovered, we prefer to wash such hydrogels at temperatures above about 60° C.

The preferred method consists of dissolving solid ammonium carbonate in a solution of zirconyl chloride or zirconium nitrate while efficiently mixing the solution so that the precipitate which forms dissolves. Ammonium carbonate is added to the point where further addition would result in a precipitate which would not redissolve. The resulting solution is mixed with a solution of ammonium acetate of such concentration and in such proportion that a zirconia sol forms having a pH between 3.8 and 5.5. This sol on standing will set to a hydrogel; the time of gelation depends upon the concentration, acidity and temperature. All zirconia hydrogels prepared by this procedure retain their form and most of them are as firm or firmer than silica hydrogels. These zirconia hydrogels when placed in water at room temperature disintegrate to form small fragments and may partially liquefy, however, at 60° C. or above, they are stable and may be washed free of soluble salts and dried.

Instead of reacting the zirconium compounds with ammonium carbonate and ammonium acetate other soluble carbonates and acetates and salts of weak acids may be used, as for example, sodium carbonate, sodium acetate, potassium acetate, etc. Metal carbonates and metal acetates offer a disadvantage in that a more thorough washing of the hydrogels must be conducted, since the water soluble products formed are non-volatile. Residual ammonium held in the gel, probably zeolitically but not as a salt, is removed during drying as ammonia. Zirconia hydrogels may be manufactured by reacting water soluble zirconium compounds with either ammonium carbonate or sodium acetate; these hydrogels liquefy to a large extent when washed at room temperature, but are stable on washing above 60° C. Hydrogels prepared from zirconyl chloride and sodium carbonate by the Hurd et al. method are stable on standing at room temperature, but dissolve in water at any temperature and hence are of no value.

To summarize the characteristic behaviour of zirconia gels formed by reactions of water soluble salts of weak acids, it has been established that stable hydrogels capable of being washed and dried may be prepared by observing certain basic considerations. If water soluble salts of two or more weak acids are reacted with water soluble zirconium compounds to form a gel in which the major molar proportion of insoluble inorganic oxide is zirconia, the gel may be washed at varying temperatures, including room temperature and below. However, zirconia is dissolved to some extent and lost by washing at the lower temperatures and we prefer to wash at 60° C. or above. Stable gels in which zirconia constitutes the major molar proportion of insoluble inorganic oxides may also be prepared by reaction of soluble zirconium compounds and a single water soluble salt of a weak acid other than alkali metal carbonates, if the gel is washed at a temperature of at least about 60° C. As pointed out above, no method is known to us for preparing stable zirconia hydrogels if only alkali metal carbonates are used to form the gelable sol. However, mixtures of such carbonates with other salts of weak acids yield gels which can be washed at room temperature and below, although such washing at low temperature does result in some loss of zirconia from the gel.

In general, the alkali metal, ammonium and alkaline earth metal salts of weak acids are considered more suitable for the purposes of the invention, and of these the alkali metal and ammonium salts are generally more suitable for use in the invention. For many purposes, ammonium salts are best because ammonia can be driven from the gel as a gas, eliminating the removal problem encountered with non-volatile metals. For best results, pH value at the time of gelation should be correlated to the salt or salts employed. For example, acetates are preferably used at pH 1.5 to 5.5; ammonium carbonate is best used at pH 1.5 to 3; and mixtures of acetates and carbonates are fully effective over the range pH 1.5 to 7.

It has been found that gels consisting of zirconia will decompose at temperatures below those at which many catalytic substances are employed. As a general rule, gels consisting of zirconia will not tolerate temperatures above about 300° C. Commercial catalytic cracking operations, however, normally involve temperatures of 400–500° C. This defect can be largely overcome by the use of zirconia in combination with another inorganic oxide which acts to render the combination much more resistant to temperatures. Gels may be formed according to this invention containing silica, boric oxide, alumina or other water insoluble amphoteric oxide. Gels containing such other oxides in substantial amounts are stable at higher temperatures and gels within the scope of the invention may be prepared which are suitable for use at the temperatures involved in catalytic cracking and regeneration of the catalyst.

In regard to time of gelation, it may be stated in general that the time of gelation is a minimum at about pH 4.5. At constant pH, the gelation time decreases with increasing concentration or with increasing temperature. The most concentrated gels, hence, are prepared at temperatures below room temperature and at about pH 4.5.

The zirconia hydrogels prepared as described in Examples I, II, and III were washed at about 65° C. until substantially free of soluble salts, dried at about 80° C. to constant weight and then dried at gradually-increasing temperatures to 300° C., at which temperature the gels were maintained for five hours.

*Example I*

Two hundred-fifty grams of solid ammonium carbonate were mixed with five liters of a solution containing 1960 grams of $ZrOCl_2 \cdot 8H_2O$ until solution was complete. This solution was cooled to about 5° C. and then stirred by means of an efficient mechanical device while 3.75 liters of 2.35 normal ammonium acetate were added. A colloidal solution of zirconia formed which has a pH of 4.4 and set to a gel 90 seconds after the ammonium acetate solution was added. This hydrogel was stable on standing at room temperature.

*Example II*

To four liters of a solution containing 3,136 grams of $ZrOCl_2 \cdot 8H_2O$ were added 5.76 liters of four normal sodium acetate while the former solution was stirred with an efficient mechanical mixer. Both solutions were cooled to about 5° C. prior to mixing. The resulting sol had a pH of 4.3 and set to a gel in 38 seconds. This hydrogel was unstable at room temperature, reliquefying after a period of time; however, it was stable during the washing at 65° C. and after this, was readily dried without reliquefaction.

*Example III*

A solution containing 784 grams of $ZrOCl_2 \cdot 8H_2O$ and 100 grams of ammonium carbonate per liter was mixed in a mixing nozzle with an eight normal solution of ammonium acetate to form a sol, which was extruded into a column of oil and thereby dispersed into globules which set to a hydrogel in the oil. The hydrogel beads were conducted out of the bottom of the column in a stream of water and immediately placed in water at 65° C. and washed. The two solutions were cooled to about 5° C. before mixing. They were mixed in the ratio of 1.00 volumes of zirconyl chloride-ammonium carbonate solution to 0.370 volume of ammonium acetate solution. The zirconia sol had a pH of 3.9 and a gelation time of 10 seconds.

The zirconia hydrogel prepared according to this example was stable at room temperature, but not completely stable in water at room temperature; however, only a small amount of zirconia was lost by solution as determined by washing a portion of this hydrogel with water at room temperature.

*Example IV*

A zirconia hydrogel was prepared according to Example I, using the same quantity of reagents as reported therein. The salt-free hydrogel was soaked in 590 cc. of ethyl silicate, diluted to 3.25 liters with 95% ethyl alcohol to give an approximate composition on the dry basis of 80% $ZrO_2$, 20% $SiO_2$. After standing overnight, the ethyl silicate solution was poured off and the hydrogel was covered with water and allowed to stand six hours at room temperature, then overnight at 160° F. After draining the impregnated hydrogel, it was dried at 180° F. until shrinkage was substantially complete and then dried at a gradually increasing temperature to 1100° F. The dry gel was tested as a cracking catalyst in the form of 6–14 mesh size granules under standard conditions, which involved passing a fraction of Oklahoma City Gas Oil having a boiling range of 470° to 708° F. through the catalyst bed at a liquid space velocity of 1.5 for 20-minute periods between regenerations and at a temperature of 800° F. 57% of the oil charged was converted to gasoline having a 410° F. end point.

*Example V*

A salt-free zirconia hydrogel prepared as described in Example I was ball-milled for 16 hours with a washed alkali-free silica hydrogel prepared in the conventional manner. The hydrogels were mixed in such proportion that an approximate composition of 80% zirconia, 20% silica on the dry basis was obtained. The composited slurry of hydrogels was pressed into a cake and dried as described in Example IV. The dry gel when tested under standard conditions resulted in a 42% conversion of gas oil to 410° F. end point gasoline.

*Example VI*

This illustration is similar to that of Example V, the only modification is the substitution of alkali-free silica-alumina hydrogel for silica hydrogel. This silica-alumina hydrogel when converted to the dry gel gave a 24% conversion of gas oil to gasoline under standard conditions whereas the dry gel of this example (80% zirconia, 20% silica-alumina) yielded a 44% conversion to gasoline.

*Example VII*

The use of formates is typified by a gel produced by action of ammonium formates. A sol was prepared by adding 13 grams of ammonium formate to 100 cc. of an aqueous solution containing 39.2 grams $ZrOCl_2 \cdot 8H_2O$ and stirring until the precipitate dissolved. That sol was mixed with an equal volume of 0.20 normal ammonium formate producing a sol of pH 2.6 which set in 30 seconds at room temperature. The resultant gel was washed at 60–65° C. without appreciable losses.

*Example VIII*

Sodium nitrite was added to the zirconyl chloride solution of Example VII in the ratio of 5 grams of salt per 100 cc. of solution. A small amount of precipitate formed but re-dissolved on stirring. One volume of saturated sodium nitrite solution was added to five volumes of the sol and the mixture was found to have a pH of 3.3 and a setting time of ten seconds at room temperature. The gel was washed and dried in the same manner as in Example VII.

*Example IX*

To 900 cc. of an aqueous solution containing 0.392 gram $ZrOCl_2 \cdot 8H_2O$ per cc. was added 45 grams of ammonium carbonate and this was then mixed with 557 cc. sodium silicate solution prepared by dilution of N brand water glass to 0.025 gram $SiO_2$ per cc. This was cooled to 0° C., stirred with 198 cc. of eight normal ammonium acetate, also cooled to 0° C. to give a sol having a pH of 4.5 which set in one minute. The gelation time of this sol at room temperature is so short that efficient mixing at room temperature is impossible. Satisfactory use of the technique of Example III is achieved by injecting the cold sol at 0° C. to an oil column maintained at room temperature. The globules of sol are heated by the oil and thus caused to gel in a shorter time to firm hydrogel beads. In either case, the gel is washed at 60° to 65° C., dried overnight at 90° C. and heat treated at 550° C. to prepare a catalyst for the cracking of hydrocarbon oils.

Example X

It has been shown above that more stable gels may be produced by reacting salts of two different weak acids with a water soluble zirconium compound in an aqueous solution. In general, substantially the same results may be attained by using an aqueous base, such as ammonia, sodium hydroxide, potassium hydroxide, etc., and a water soluble salt of a weak acid. In such cases, the aqueous base is added to an aqueous solution of a water soluble zirconium compound and the salt of a weak acid is then added to the solution to adjust the pH to a desired value.

Ammonia is added to a solution of zirconium chloride just until the precipitate first formed no longer redissolves. Aqueous ammonium acetate is then added with efficient agitation in an amount sufficient to adjust the pH to 4.4. Gelation takes place within a relatively short time. This gel is washed at 60° to 65° C. and then dried in the usual manner indicated above. The gel is characterized by a stability considerably better than that enjoyed by a gel prepared by the use of a single weak acid salt and is on the order of that obtained when salts of two weak acids are used.

Example XI

To 2.00 liters of zirconyl chloride solution containing 1568 grams $ZrOCl_2 \cdot 8H_2O$ was added with vigorous stirring 3.40 liters of 3.47 normal calcium acetate. Both solutions had previously been cooled to about 5° C. The hydrosol thus formed had a pH of 4.9 and set to a firm gel in 50 seconds. The hydrogel was washed (at 65° C.) and dried in the usual manner to yield a hard, transparent product.

Example XII

Eighty-five grams of solid sodium nitrite were mixed with 1.00 liters of a solution containing 392 grams $ZrOCl_2 \cdot 8H_2O$. This solution was cooled to 5° C. and then stirred vigorously while 0.400 liter of 4 normal sodium nitrite were added. The hydrogel had a pH of 3.6 and set to a gel in 35 seconds.

We claim:

1. A method for formation of zirconia-containing gels comprising reacting in aqueous solution a water soluble zirconium compound and water soluble salts of at least two weak acids to effect formation of a homogeneous hydrosol in which zirconia is the major water insoluble inorganic oxide component and which has a pH value of about 4.5, permitting the said hydrosol to set forming a hydrogel containing zirconia and washing said hydrogel to remove water soluble salts therefrom.

2. A method for formation of zirconia-containing gels comprising reacting in aqueous solution a water soluble zirconium compound and water soluble salts of acetic acid and at least one other weak acid to effect formation of a homogeneous hydrosol in which zirconia is the major water insoluble inorganic oxide component and which has a pH value between about 1.5 and about 7.0, permitting the said hydrosol to set forming a hydrogel containing zirconia and washing said hydrogel to remove water soluble salts therefrom.

3. A method for formation of zirconia-containing gels comprising reacting in aqueous solution a water soluble zirconium compound, ammonium acetate and a water soluble salt of at least one other weak acid to effect formation of a homogeneous hydrosol in which zirconia is the major water insoluble inorganic oxide component and which has a pH value between about 1.5 and about 7.0, permitting the said hydrosol to set forming a hydrogel containing zirconia and washing said hydrogel to remove water soluble salts therefrom.

4. A method for formation of zirconia-containing gels comprising reacting in aqueous solution a water soluble zirconium compound, a water soluble ammonium salt of a weak acid and a water soluble salt of at least one other weak acid to effect formation of a homogeneous hydrosol in which zirconia is the major water insoluble inorganic oxide component and which has a pH value between about 1.5 and about 7.0, permitting the said hydrosol to set forming a hydrogel containing zirconia and washing said hydrogel to remove water soluble salts therefrom.

5. A method for formation of zirconia-containing gels comprising reacting in aqueous solution zirconyl chloride and water soluble salts of at least two weak acids to effect formation of a homogeneous hydrosol in which zirconia is the major water insoluble inorganic oxide component and which has a pH value between about 1.5 and about 7.0, permitting the said hydrosol to set forming a hydrogel containing zirconia and washing said hydrogel to remove water soluble salts therefrom.

6. A method for formation of zirconia-containing gels comprising reacting in aqueous solution zirconyl chloride, a water soluble ammonium salt of a weak acid and a water soluble salt of at least one other weak acid to effect formation of a homogeneous hydrosol in which zirconia is the major water insoluble inorganic oxide component and which has a pH value between about 1.5 and about 7.0, permitting the said hydrosol to set forming a hydrogel containing zirconia and washing said hydrogel to remove water soluble salts therefrom.

7. A method for formation of zirconia-containing gels comprising reacting in aqueous solution zirconyl chloride, ammonium acetate and a water soluble salt of at least one other weak acid to effect formation of a homogeneous hydrosol in which zirconia is the major water insoluble inorganic oxide component and which has a pH value between about 1.5 and about 7.0, permitting the said hydrosol to set forming a hydrogel containing zirconia and washing said hydrogel to remove water soluble salts therefrom.

8. A method for formation of zirconia-containing gels comprising reacting in aqueous solution a water soluble zirconium compound and water soluble salts of acetic acid and at least one other weak acid to effect formation of a homogeneous hydrosol in which zirconia is the major water insoluble inorganic oxide component and which has a pH value between about 1.5 and about 7.0, permitting the said hydrosol to set forming a hydrogel containing zirconia and washing said hydrogel to remove water soluble salts therefrom, at a temperature not substantially below about 60° C.

9. A method for formation of zirconia-containing gels comprising reacting in aqueous solution a water soluble zirconium compound, ammonium acetate and a water soluble salt of at least one other weak acid to effect formation of a homogeneous hydrosol in which zirconia is the major water insoluble inorganic oxide component and which has a pH value between about 1.5 and about 7.0, permitting the said hydrosol to set forming a hydrogel containing zirconia and washing said hydrogel to remove water soluble salts therefrom, at a temperature not substantially below about 60° C.

10. A method for formation of zirconia-containing gels comprising reacting in aqueous solution a water soluble zirconium compound, a water soluble ammonium salt of a weak acid and a water soluble salt of at least one other weak acid to effect formation of a homogeneous hydrosol in which zirconia is the major water insoluble inorganic oxide component and which has a pH value between about 1.5 and about 7.0, permitting the said hydrosol to set forming a hydrogel containing zirconia and washing said hydrogel to remove water soluble salts therefrom, at a temperature not substantially below about 60° C.

11. A method for formation of zirconia gels comprising reacting in aqueous solution of a water soluble zirconium compound and water soluble salts of at least two weak acids to effect formation of a homogeneous hydrosol in which zirconia is substantially the only water insoluble inorganic oxide and which has a pH value between about 1.5 and about 7.0, permitting the said hydrosol to set forming a hydrogel of zirconia, washing said hydrogel to remove water soluble salts therefrom at a temperature not substantially below about 60° C., drying said washed hydrogel at about 75° to about 120° C. and thereafter dehydrating the same at a temperature not substantially above about 300° C.

12. A method for formation of zirconia-containing gels comprising reacting in aqueous solution zirconyl chloride and water-soluble salts of at least two weak acids to effect formation of a homogeneous hydrosol in which zirconia is the major water-soluble inorganic oxide component and which has a pH value between about 1.5 and about 7.0, permitting the said hydrosol to set forming a hydrogel containing zirconia and washing said hydrogel to remove water-soluble salts therefrom, at a temperature not substantially below about 60° C.

13. A method for formation of zirconia-containing gels comprising reacting in aqueous solution zirconyl chloride and water-soluble salts of at least two weak acids to effect formation of a homogeneous hydrosol in which zirconia is the major water-insoluble inorganic oxide component and which has a pH value between about 1.5 and about 7.0, permitting the said hydrosol to set forming a hydrogel containing zirconia and washing said hydrogel to remove water-soluble salts therefrom, at a temperature not substantially below about 60° C., drying said washed hydrogel at about 75° C. to about 120° C. and thereafter dehydrating the same at a temperature not substantially above about 300° C.

14. A method for formation of zirconia-containing gels comprising reacting in aqueous solution a water-soluble zirconium compound and water-soluble salts of at least two weak acids to effect formation of a homogeneous hydrosol in which zirconia is the major water-insoluble inorganic oxide component and which has a pH value between about 1.5 and about 7.0, permitting the said hydrosol to set forming a hydrogel containing zirconia and washing said hydrogel to remove water-soluble salts therefrom.

15. A stable inorganic oxide gel consisting of zirconia, capable of being water-washed at room temperature without disintegration, which results from the reaction of a water-soluble zirconium compound and water-soluble salts of at least two weak acids to effect formation of a gelable hydrosol of zirconia having a pH value between about 1.5 and about 7.0, permitting the said hydrosol to set forming a hydrogel of zirconia and washing said hydrogel to remove water-soluble salts therefrom.

16. A process for the conversion of hydrocarbons which comprises contacting hydrocarbon vapor at conversion conditions of temperature and pressure with a catalyst consisting of silica impregnated zirconia gel prepared by a process comprising reacting in aqueous solution a water-soluble zirconium compound and water-soluble salts of at least two weak acids to effect formation of a gelable hydrosol of zirconia having a pH value between about 1.5 and about 7.0, permitting the said hydrosol to set forming a hydrogel consisting of zirconia, washing said hydrogel to remove water-soluble salts therefrom, soaking the salt-free hydrogel in silicate solution to give an approximate composition on the dry basis of 80 per cent zirconia and 20 per cent silica, removing the impregnated hydrogel from the silicate solution, soaking said hydrogel in water until substantially free of soluble salts, draining the washed impregnated hydrogel and drying the same at an elevated temperature.

MILTON M. MARISIC.
EDWARD M. GRIEST.

REFERENCES CITED

The following references are of record in the file of this patent:

UNITED STATES PATENTS

| Number | Name | Date |
|---|---|---|
| 2,289,918 | Lee et al. | July 14, 1942 |
| 2,338,089 | Bond, Jr. | Jan. 4, 1944 |
| 2,349,243 | Bates | May 23, 1944 |
| 2,378,904 | Bates | June 26, 1945 |

OTHER REFERENCES

Mellor, Treatise on Inorganic and Theoretical Chemistry (1927), vol. 7, pages 129 to 132, Longman's Green and Co., Publishers.

Certificate of Correction

Patent No. 2,442,772.  June 8, 1948.

MILTON M. MARISIC ET AL.

It is hereby certified that error appears in the printed specification of the above numbered patent requiring correction as follows: Column 9, line 39, claim 12, for "water-soluble" read *water-insoluble*; and that the said Letters Patent should be read with this correction therein that the same may conform to the record of the case in the Patent Office.

Signed and sealed this 16th day of November, A. D. 1948.

[SEAL]

THOMAS F. MURPHY,
*Assistant Commissioner of Patents.*